US012801621B2

(12) United States Patent
Muttreja et al.

(10) Patent No.: US 12,801,621 B2
(45) Date of Patent: Nov. 17, 2026

(54) APPLICATION PROGRAMMING INTERFACE (API) INTEGRATIONS FOR NETWORK EXPOSURE AT SCALE

(71) Applicant: Boost SubscriberCo L.L.C., Englewood, CO (US)

(72) Inventors: Madhuri Muttreja, Parker, CO (US); Rajesh Chilka, Littleton, CO (US); Ahmed Mostafa, Centennial, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 18/979,057

(22) Filed: Dec. 12, 2024

(65) Prior Publication Data

US 2026/0170004 A1 Jun. 18, 2026

(51) Int. Cl.

| | |
|---|---|
| ***G06F 16/00*** | (2019.01) |
| ***G06F 16/23*** | (2019.01) |
| ***G06F 16/25*** | (2019.01) |
| ***H04W 12/08*** | (2021.01) |

(52) U.S. Cl.

CPC ............ *G06F 16/254* (2019.01); *G06F 16/23* (2019.01); *H04W 12/08* (2013.01)

(58) Field of Classification Search

CPC ............................... G06F 16/254; G06F 16/25

See application file for complete search history.

(56) References Cited

U.S. PATENT DOCUMENTS

| | | | | |
|---|---|---|---|---|
| 11,922,239 | B1 * | 3/2024 | Vasudevan | G06F 9/547 |
| 12,353,380 | B2 * | 7/2025 | Dean | G06F 3/016 |
| 2018/0232262 | A1 * | 8/2018 | Chowdhury | G06F 9/541 |
| 2021/0112059 | A1 * | 4/2021 | Heldman | H04L 63/0807 |
| 2024/0143323 | A1 * | 5/2024 | Sun | G06F 9/547 |
| 2024/0259428 | A1 * | 8/2024 | Verma | H04L 61/4588 |

OTHER PUBLICATIONS

Tayyaba et al., "5G Cellular Network Integration with SDN: Challenges, Issues and Beyond," 2017 International Conference on Communication Computing and Digital Systems (C-CODE), IEEE, 2017, pp. 48-53. (Year: 2017).*

Gurbani et al., "A System Approach for Closer Integration of Cellular and Internet Services," IEEE Network, Jan./Feb. 2005, pp. 1-7. (Year: 2005).*

* cited by examiner

*Primary Examiner* — Cheryl Lewis

(74) *Attorney, Agent, or Firm* — Lowenstein Sandler LLP

(57) ABSTRACT

Technologies for application programming interfaces (APIs) integration for a cellular network are described. One method includes receiving, from a first API resource of a plurality of API resources, a first API request in a first API format, wherein the first API request is directed to a second API resource of the plurality of API resources; processing the first API request with an abstraction model, wherein the abstraction model provides a generalized method to handle an API request; and sending, to the second API resource, a second API request, wherein the second API request comprises a result from processing the first API request.

19 Claims, 5 Drawing Sheets

APPLICATION PROGRAMMING INTERFACE (API) INTEGRATIONS FOR NETWORK EXPOSURE AT SCALE

BACKGROUND

Cellular networks are highly complex. One type of cellular network is a fifth generation (5G) new radio (NR) cellular network. 5G NR cellular networks have the promise to provide higher throughput, lower latency, and higher availability compared with previous global wireless standards. However, various application programming interfaces (APIs) in a 5G NR cellular network cannot be integrated efficiently, which may compromise such promise.

BRIEF DESCRIPTION OF THE DRAWINGS

The present disclosure is illustrated by way of example, and not by way of limitation, in the figures of the accompanying drawings.

DETAILED DESCRIPTION

Figure 1:
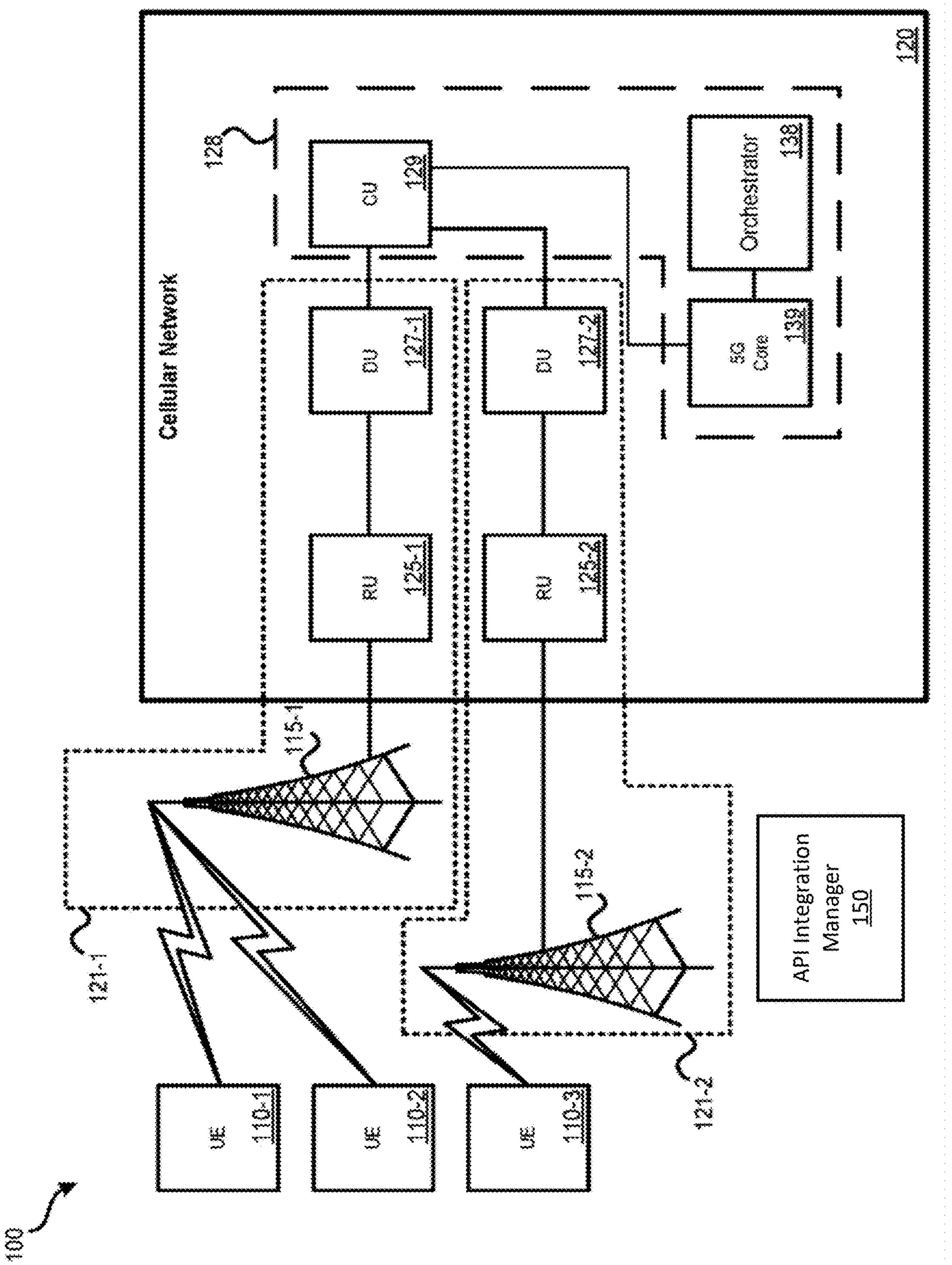
FIG. 1 is a block diagram of a system implementing application programming interfaces (APIs) integration for a cellular network according to at least one embodiment.

Technologies for implementing application programming interfaces (APIs) integration for a telecommunications network, such as a cellular network (e.g., 5G wireless network, 6G wireless network) are described. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

An application programming interface (API) is a set of programming code that enables data transmission between one software and another software, and is used by all kind of functions in the network. However, the incoherency of APIs throughout the network causes the underutilization of APIs and the economic loss for certain network exposure at scale.

Aspects and embodiments of the present disclosure address the above and other deficiencies by providing a system that implements APIs integration for a cellular network. Specifically, a component of the cellular network (e.g., API integration manager) may receive, from one API resource ("source API resource"), an API request in a first API format, wherein the API request is directed to another API resource ("destination API resource"). The system may include various API resources, such as a first set of network elements in one or more base stations, a second set of network elements in one or more transports, a third set of network elements in one or more core networks, a fourth set of network elements in one or more cloud-computing platforms, a fifth set of network elements in one or more network slices, or a set of external API resources that are external to the cellular network, and the set of external API resources comprises API resources from at least one of: an application, a service, a developer, an access gateway, an operation support system, or a business support system. Each of these API resources may serve as a source API resource or a destination API resource of an API request.

The component of the cellular network (e.g., API integration manager) may process the API request with an abstraction model, wherein the abstraction model provides a generalized method to handle an API request. In some implementations, the API integration manager may extract first data from the API request, transform the first data to second data, and load the second data into a data store. In some implementations, the API integration manager may determine a routing of the API request and/or a gateway of the API request. In some implementations, the API integration manager may translate data in a first API format into a second API format. In some implementations, the API integration manager may store definitions of the first API format and the second API format. In some implementations, the API integration manager may manage a monetization model associated with the API request. In some implementations, the API integration manager may manage an access to a service catalog associated with the API request. In some implementations, the API integration manager may provide a customization with a communications service provider (CSP) associated with the API request. The component of the cellular network (e.g., API integration manager) may send, to the destination API resource, a second API request, wherein the second API request comprises a result from processing the API request described above, including using the abstraction model, extracting, transforming, loading, translating, etc.

Aspects and embodiments of the present disclosure can provide an APIs integration system with coherent API abstraction, design, development and governance. Aspects of the present disclosure can provide an overarching umbrella for streamlining and standardizing the API design and development, standardized protocols per telecom standard agency, and consistency and breaking change management at scale for management for enterprise solutions and/or marketplace offerings model.

FIG. 1 illustrates an embodiment of a cellular network system 100 ("system 100"). FIG. 1 represents an embodiment of a cellular network which can accommodate the cloud-based architecture. System 100 can include a 5G New Radio (NR) cellular network; other types of cellular networks, such as 6G, 7G, etc. may also be possible. System 100 can include: UEs 110 (UE 110-1, UE 110-2, UE 110-3); base station 121; cellular network 120; radio units 125 ("RUs 125"); distributed units 127 ("DUs 127"); centralized unit 129 ("CU 129"); 5G core 139, and orchestrator 138. FIG. 1 represents a component-level view. In an open radio access network (O-RAN), because components can be implemented as specialized software executed on general-purpose hardware, except for components that need to receive and transmit radio frequency (RF), the functionality of the various components can be shifted among different servers. For at least some components, the hardware may be maintained by a separate cloud-service provider, to accommodate where the functionality of such components is needed.

UE 110 can represent various types of end-user devices, such as cellular phones, smartphones, cellular modems, cellular-enabled computerized devices, sensor devices, gaming devices, access points (APs), any computerized device capable of communicating via a cellular network, etc. Generally, UE can represent any type of device that has an incorporated 5G interface, such as a 5G modem. Examples can include sensor devices, Internet of Things (IoT) devices, manufacturing robots; unmanned aerial (or land-based) vehicles, network-connected vehicles, etc. Depending on the location of individual UEs, UE 110 may use RF to communicate with various base stations of cellular network 120. As illustrated, two base stations 121 are illustrated: base station 121-1 can include: structure 115-1, RU 125-1, and DU 127-1. Structure 115-1 may be any structure to which one or more antennas (not illustrated) of the base station are mounted. Structure 115-1 may be a dedicated cellular tower, a building, a water tower, or any other human-made or natural structure to which one or more antennas can reasonably be mounted to provide cellular coverage to a geographic area. Similarly, base station 121-2 can include: structure 115-2, RU 125-2, and DU 127-2.

Real-world implementations of system 100 can include many (e.g., thousands) of base stations (BSs) and many CUs and 5G core 139. Structures 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station 121 equipment may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 127-1, may communicate with CU 129. Collectively, an RU, DU, and CU create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized O-RAN implementation, CU 129, 5G core 139, and/or orchestrator 138 can be implemented virtually as software being executed by general-purpose computing equipment, such as in a data center of a cloud-computing platform, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100, cloud-based cellular network components 128 include CU 129, 5G core 139, and orchestrator 138. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new core function, orchestrator 138 can perform a pipeline of calling the core function code from a software repository incorporated as part of, or separate from, cellular network 120; pulling corresponding configuration files (e.g., helm charts); creating Kubernetes nodes/pods; loading the related core function containers; configuring the core function; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the quality of service (QoS) and quality of experience (QoE) for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

5G core 139, which can be physically distributed across data centers or located at a central national data center (NDC), can perform various core functions of the cellular network. 5G core 139 can include: network resource management components; policy management components; subscriber management components; and packet control components. Individual components may communicate on a bus, thus allowing various components of 5G core 139 to communicate with each other directly. 5G core 139 is simplified to show some key components. Implementations can involve additional other components.

Network resource management components can include network repository function (NRF) and network slice selection function (NSSF) (e.g., NSSF 338). NRF can allow 5G network functions (NFs) to register and discover each other via a standards-based application programming interface (API). NSSF can be used by access and mobility management function (AMF) (e.g., AMF 334) to assist with the selection of a network slice that will serve a particular UE.

Policy management components can include charging function (CHF) and policy control function (PCF) (e.g., PCF 335). CHF allows charging services to be offered to authorized network functions. Converged online and offline charging can be supported. PCF allows for policy control functions and the related 5G signaling interfaces to be supported.

Subscriber management components can include unified data management (UDM) (e.g., UDM 336) and authentication server function (AUSF) (e.g., AUSF 337). UDM can allow for generation of authentication vectors, user identification handling, NF registration management, and retrieval of UE individual subscription data for slice selection. AUSF performs authentication with UE.

Packet control components can include access and mobility management function (AMF) (e.g., AMF 334) and session management function (SMF) (e.g., SMF 333). AMF can receive connection- and session-related information from UE and is responsible for handling connection and mobility management tasks. SMF is responsible for interacting with the decoupled data plane, creating updating and removing protocol data unit (PDU) sessions, and managing session context with the user plane function (UPF) (e.g., manage UE context and network handovers between base stations).

User plane function (UPF) (e.g., UPF 332) can be responsible for packet routing and forwarding, packet inspection, QoS handling, and external PDU sessions for interconnecting with a data network (DN) (e.g., DN 380) (e.g., the Internet) or various access networks. Access networks can include the RAN of cellular network 120.

The SMF 333 may configure or control the UPF 332 via the N4 interface. For example, the SMF 333 may control packet forwarding rules used by the UPF 332 and adjust QoS parameters for QoS enforcement of data flows (e.g., limiting available data rates). In some cases, multiple SMF/UPF pairs may be used to simultaneously manage user plane traffic for a particular user device, such as UE 210. For example, a set of SMFs may be associated with UE 210, where each SMF of the set of SMFs corresponds with a network slice. The SMF 333 may control the UPF 332 on a per end user data session basis, in which the SMF 333 may create, update, and remove session information in the UPF 332.

Decoupling control signaling in the control plane from user plane traffic in the user plane may allow the UPF 332 to be positioned in close proximity to the edge of a network compared with the AMF 334. As a closer geographic or topographic proximity may reduce the electrical distance, the electrical distance from the UPF 332 to the UE 210 may be less than the electrical distance of the AMF 334 to the UE 210.

5G core 139 may reside on a cloud computing platform. While from a client's or user's point of view, the "cloud" can be envisioned as an ephemeral computing workspace that occupies no physical space, in reality, a cloud computing platform is an interconnected group of data centers throughout which computing and storage resources are spread. Therefore, data centers may be scattered geographically and can provide redundancy.

In some embodiments, the system 100 includes an API integration manager 150 that implements APIs integration in a cellular network. Further details regarding the operations of the API integration manager 150 are described below with reference to FIGS. 2-5.

Figure 2:
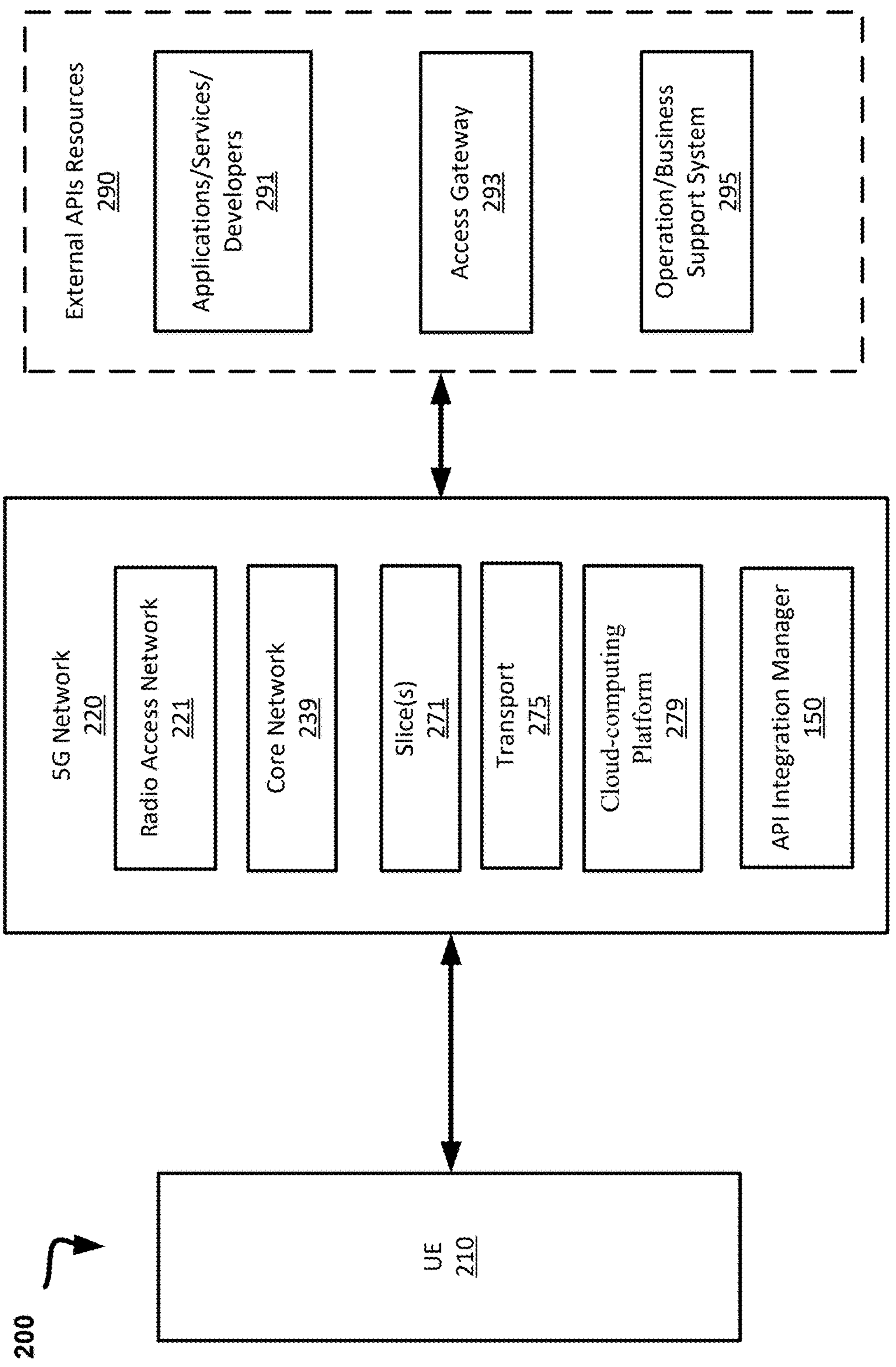
FIGS. 2 and 3 are block diagrams of systems including API integration manager that implements APIs integration for a cellular network according to at least some embodiments.
Figure 3:
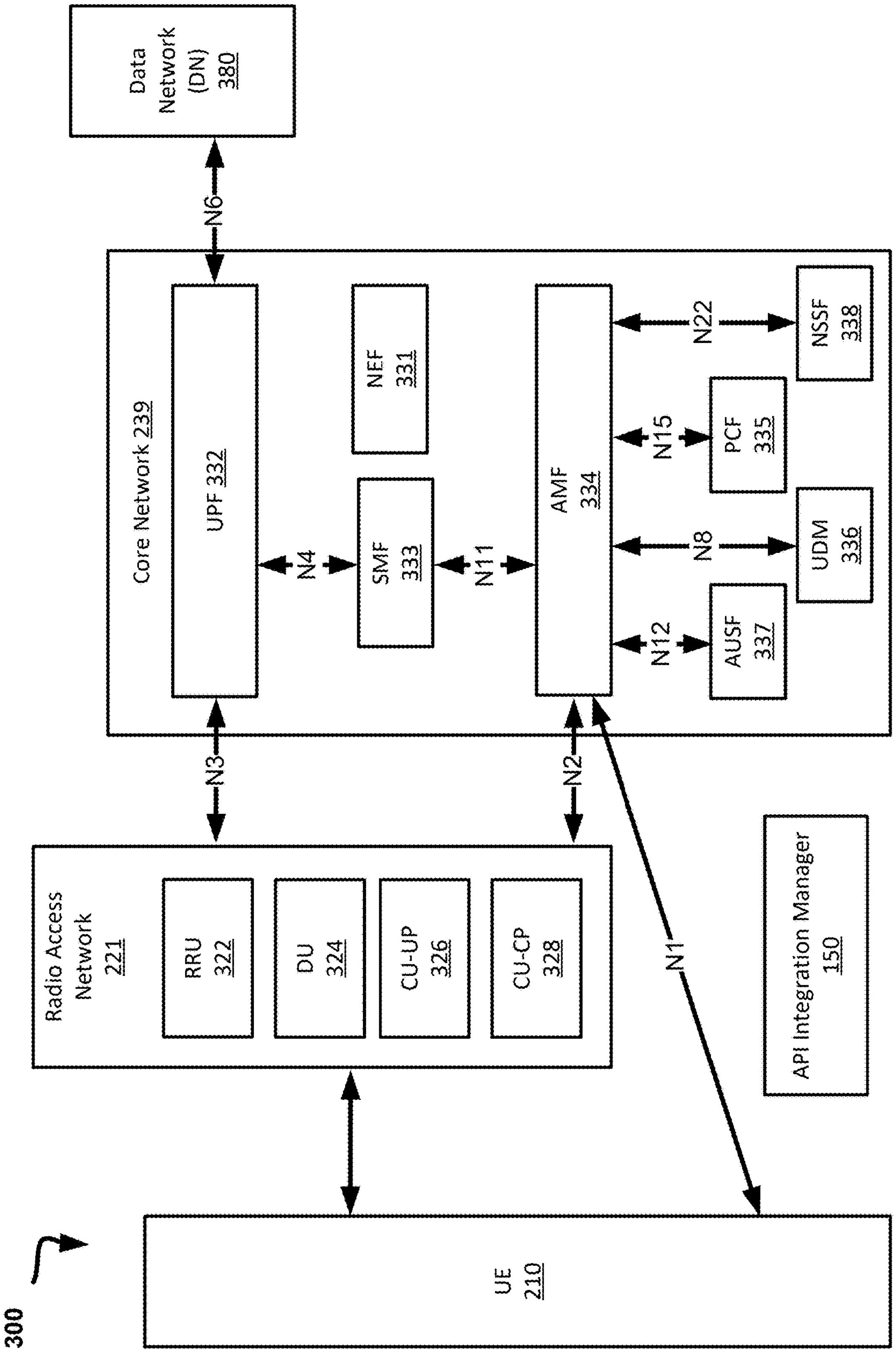

FIG. 2 is a block diagram of an example system including an API integration manager according to at least one embodiment. Referring to FIG. 2, a system 200 includes UE 210, a 5G network 220, and API resources 290 according to at least one embodiment. The 5G network 220 includes a radio access network (RAN) 221, a core network 239, and a cloud-computing platform 279 according to at least one embodiment. In at least one embodiment, an API integration manager 150 can be implemented in the 5G network 220. In at least one embodiment, an API integration manager 150 can be implemented in other components of the system 200. FIG. 3 illustrates a block diagram of an example API integration manager that implements APIs integration in a cellular network according to at least one embodiment. The 5G network 220 may further include network slices 271, transport 275, and cloud-computing platform 279.

Referring to FIGS. 2 and 3, the 5G network 220 connects user equipment (UE) 210 to the data network (DN) 380, and APIs resources 290. The APIs resources 290 may include applications, services, developers 291, access gateway 293, and operation and business support system 295. The applications, services, developers 291 may include providers offering access to and management of applications or software over the internet and/or developers designing applications or programs. The access gateway 293 may include a server that controls access to web-based content, portals, and web applications that employ authentication and access control policies. The operation and business support system 295 may include a combination of hardware and software tools that manages networks and customers.

The DN 380 can include the Internet, a local area network (LAN), a wide area network (WAN), a private data network, a wireless network, a wired network, or a combination of networks. The UE 210 can include an electronic device with wireless connectivity or cellular communication capability, including mobile computing device such as a mobile phone or handheld computing device, and non-mobile computing device. In at least one example, the UE 210 can include a 5G smartphone or a 5G cellular device that connects to the RAN 221 via a wireless connection. The UE 210 can include one of a number of UEs not depicted that are in communication with the RAN 221. The UE 210 may include mobile and non-mobile computing devices. The UE 210 may include laptop computers, desktop computers, an Internet-of-Things (IoT) devices, and/or any other electronic computing device that includes a wireless communications interface to access the RAN 221.

The RAN 221 includes a remote radio unit (RRU) 322 for wirelessly communicating with UE 210. The RRU 322 can include a Radio Unit (RU) and may include one or more radio transceivers for wirelessly communicating with UE 210. The RRU 322 may include circuitry for converting signals sent to and from an antenna of a Base Station into digital signals for transmission over packet networks. The RAN 221 may correspond with a 5G radio Base Station that connects user equipment to the core network 239. The 5G radio Base Station may be referred to as a generation Node B, a "gNodeB," or a "gNB." A Base Station may refer to a network element that is responsible for the transmission and reception of radio signals in one or more cells (or coverage areas) to or from user equipment, such as UE 210. The RAN 221 can include a new-generation radio access network (NG-RAN) that uses the 5G NR interface. In some embodiments, the distributed unit (DU) 324 and the centralized unit (CU) of the RAN 221 may be co-located with the RRU 322. In other embodiments, the DU 324 and the RRU 322 may be co-located at a cell site and the centralized unit (CU) may be located within a local data center (LDC). The DU 324 can include a logical node configured to provide functions for the radio link control (RLC) layer, the medium access control (MAC) layer, and the physical layer (PHY) layers. The centralized unit (CU) can be partitioned into a CU user plane portion (CU-UP) 326 and a CU control plane portion (CU-CP) 328. The CU-CP 328 may perform functions related to a control plane, such as connection setup, mobility, and security. The CU-UP 326 may perform functions related to a user plane, such as user data transmission and reception functions. In one example, the centralized units (CUs) can include a logical node configured to provide functions for the radio resource control (RRC) layer, the packet data convergence control (PDCP) layer, and the service data adaptation protocol (SDAP) layer. The centralized unit for the control plane (CU-CP) 328 can include a logical node configured to provide functions of the control plane part of the RRC and PDCP. The centralized unit for the user plane (CU-UP) 326 can include a logical node configured to provide functions of the user plane part of the SDAP and PDCP. In some embodiments, the RAN 221 may include virtualized CU units and virtualized DU units. The virtualized DU units can include virtualized versions of distributed units (DUs). The virtualized CU units can include virtualized versions of centralized units (CUs). Virtualizing the control plane and user plane functions allows the centralized units (CUs) to be consolidated in one or more data centers on RAN-based open interfaces.

In some embodiments, the RAN 221 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 210, over a geographic area. Some cells may correspond with stationary coverage areas and other cells may correspond with coverage areas that change over time (e.g., due to movement of a mobile RRU).

In some cases, the UE 210 may be capable of transmitting signals to and receiving signals from one or more RRUs within the network of cells over time. One or more cells may correspond with a cell site. The cells within the network of cells may be configured to facilitate communication between UE 210 and other UEs and/or between UE 210 and a data network. The cells may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). Small cells may communicate through macrocells. Although the range of small cells may be limited, small cells may enable mmWave frequencies with high-speed connectivity to UEs within a short distance of the small cells. Macrocells may transmit and receive radio signals using multiple-input multiple-output (MIMO) antennas that may be connected to a cell tower, an antenna mast, or a raised structure.

The core network 239 may utilize a cloud-native service-based architecture (SBA) in which different core network functions (e.g., authentication, security, session management, and core access and mobility functions) are virtualized and implemented as loosely coupled independent services that communicate with each other, for example, using hypertext transfer protocol (HTTP) protocols and APIs. In some cases, control plane (CP) functions may interact with each other using the service-based architecture. In at least one embodiment, a microservices-based architecture in which software is composed of small independent services that communicate over well-defined APIs may be used for implementing some of the core network functions. For example, control plane (CP) network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

The core network 239 may include a set of network elements that are configured to offer various data and telecommunications services to subscribers or end users of user equipment, such as UE 210. Examples of network elements include network computers, network processors, networking hardware, networking equipment, routers, switches, hubs, bridges, radio network controllers, gateways, servers, virtualized network functions, and network functions virtualization infrastructure. A network element can include a real or virtualized component that provides wired or wireless communication network services.

The core network 239 may include network exposure function (NEF) 331. The NEF 331 may support exposure of network functions capabilities in the core network 239 to external network functions such as 3rd party application functions. External exposure can be categorized as monitoring capability, provisioning capability, policy/charging capability, and analytics reporting capability. The monitoring capability may involve monitoring of specific event for UE and making such monitoring events information available for external exposure via the NEF. The provisioning capability may involve allowing external party to provision of information which can be used for the UE. The policy/charging capability may involve handling QoS and charging policy for the UE based on the request from external party. The analytics reporting capability may involve allowing an external party to fetch or subscribe/unsubscribe to analytics information generated by core network 239 (e.g., roaming status of a specific UE is reported by UDM to NEF and the NEF will transfer it to the 3rd party network function). The NEF 331 may serve as a security layer to untrusted 3rd party applications.

The primary core network functions can include the access and mobility management function (AMF) 334, the session management function (SMF) 333, and the user plane function (UPF) 332. The AMF 334 may interface with UE 210, act as a single-entry point for a UE connection, and perform mobility management, registration management, and connection management between DN 380 and UE 210. The AMF 334 may interface with the SMF 333 to track user sessions. The AMF 334 may interface with a network slice selection function (NSSF) 338 to select network slice instances for user equipment. When user equipment is leaving a first coverage area and entering a second coverage area, the AMF 334 may be responsible for coordinating the handoff between the coverage areas whether the coverage areas are associated with the same radio access network or different radio access networks. The SMF 333 may perform session management, user plane selection, and Internet Protocol (IP) address allocation. After the Access Gateway Function (AGF) authenticates the subscriber and establishes a protocol data unit (PDU) session, the SMF 333 may select the UPF for the subscriber.

The UPF 332 may provide subscriber tunnel encapsulations enabled by the general packet radio service (GPRS) tunneling protocol, packet processing including routing and forwarding, quality of service (QoS) handling, packet data unit (PDU) session management, policy enforcement, statistics gathering and reporting, lawful intercept requests processing, and optional advanced services. The UPF 332 may serve as an ingress and egress point for user plane traffic and provide anchored mobility support for user equipment. The UPF 332 may be implemented as a software process or application running within a virtualized infrastructure or a cloud-based compute and storage infrastructure.

The UPF 332 may transfer downlink data received from the DN 380 to the UE 210, via the RAN 221 and/or transfer uplink data received from the UE 210 to the DN 380 via the RAN 221. An uplink can include a radio link though which UE 210 transmits data and/or control signals to the RAN 221. A downlink can include a radio link through which the RAN 221 transmits data and/or control signals to the UE 210.

Uplink packets arriving from the RAN 221 may use a general packet radio service (GPRS) tunneling protocol (or GTP) to reach the UPF 332. The GPRS tunneling protocol for the user plane may support multiplexing of traffic from different PDU sessions by tunneling user data over the interface N3 between the RAN 221 and the UPF 332. The UPF 332 may remove the packet headers belonging to the GTP tunnel before forwarding the user plane packets towards the DN 380. As the UPF 332 may provide connectivity towards other data networks in addition to the DN 380, the UPF 332 ensures that the user plane packets are forwarded towards the correct data network. Each GTP tunnel may belong to a specific PDU session. Each PDU session may be set up towards a specific data network name (DNN) that uniquely identifies the data network to which the user plane packets should be forwarded. The UPF 332 may keep a record of the mapping between the GTP tunnel, the PDU session, and the DNN for the data network to which the user plane packets are directed.

Downlink packets arriving from the DN 380 are mapped onto a specific quality of service (QoS) flow belonging to a specific PDU session before forwarded towards the appropriate RAN 221. A QoS flow may correspond with a stream of data packets that have equal QoS. The PDU session may utilize one or more QoS flows to exchange traffic (e.g., data and voice traffic) between the UE 210 and the DN 380. The one or more QoS flows can include the finest granularity of QoS differentiation within the PDU session. The PDU session may belong to a network slice instance through the 5G network 220. To establish user plane connectivity from the UE 210 to the DN 380, the AMF 334 that supports the network slice instance may be selected and a PDU session via the network slice instance may be established. In some cases, the PDU session may be of type IPv4 or IPv6 for transporting IP packets. The RAN 221 may be configured to establish and release parts of the PDU session that cross the radio interface.

Other core network functions may include a network repository function (NRF) for maintaining a list of available network functions and providing network function service registration and discovery, a policy control function (PCF) 335 for enforcing policy rules for control plane functions, an authentication server function (AUSF) 337 for authenticating user equipment and handling authentication related functionality, a network slice selection function (NSSF) 338 for selecting network slice instances, and an application function (AF) (not shown) for providing application services. Application-level session information may be exchanged between the AF and PCF 335 (e.g., bandwidth requirements for QoS). In some cases, when the UE 210 requests access to resources, such as establishing a PDU session or a QoS flow, the PCF 335 may dynamically decide if the UE 210 should grant the requested access based on a location of the UE 210.

The 5G network 220 may provide one or more network slices 271, where each network slice may include a set of network functions that are selected to provide specific telecommunications services. For example, each network slice can include a configuration of network functions, network applications, and underlying cloud-based compute and storage infrastructure. In some cases, a network slice may correspond with a logical instantiation of a 5G network, such as an instantiation of the 5G network 220. In some cases, the 5G network 220 may support customized policy configuration and enforcement between network slices per service level agreements (SLAs) within the RAN 221. User equipment, such as UE 210, may connect to multiple network slices at the same time (e.g., eight different network slices). In some cases, the 5G network 220 may dynamically generate network slices to provide telecommunications services for various use cases, such as the enhanced Mobile Broadband (eMBB), Ultra-Reliable and Low-Latency Communication (URLLC), and massive Machine Type Communication (mMTC) use cases.

The transport 275 may include interfaces and communication links (e.g., links for synchronization signal transmission). For example, AMF 334 may be connected to SMF 333, PCF 335, UDM 336, AUSF 337, and NSSF 338 via different interfaces. AMF 334 may be connected to SMF 333 via an N11 interface. AMF 334 may be connected to PCF 335 via an N15 interface. AMF 334 may be connected to UDM 336 via an N8 interface. AMF 334 may be connected to AUSF 337 via an N12 interface. AMF 334 may be connected to NSSF 338 via an N22 interface. The RAN 221 may be connected to the AMF 334, which may allocate temporary unique identifiers, determine tracking areas, and select appropriate policy control functions (PCFs) for user equipment, via an N2 interface. The N2 interface may be used for transferring control plane signaling between the RAN 221 and the AMF 334. The UE 210 may be connected to the SMF 333 via an N1 interface, which may transfer UE information directly to the AMF 334 and an N11 interface. In addition, although not shown in FIG. 3, AMF 334 may be connected to evolved packet data gateway (ePDG), where ePDG can be connected through non-3Gpp based access network (e.g., untrusted WLANs) to UE 210, and therefore the interface includes multiple network connections.

The UPF 332 may be connected to the data network 380 via an N6 interface. The N6 interface may be used for providing connectivity between the UPF 332 and other external or internal data networks (e.g., to the Internet). In some cases, the data may not be tunneled across the N6 interface as IP packets may be routed based on end user IP addresses.

The UPF 332 may connect to the SMF 333 via the N4 interface. The N4 interface may be used for catering for a number of key session management procedures. The UPF 332 may receive, from SMF 333, via N4 interface, the necessary instructions in order to control and deliver the desired QoS. For example, the UPF 332 may identify and transport user plane traffic information and flow based on session management data received from the SMF 333. Each subscriber's interaction with services (in other words, the traffic the user generates) can be described as a subscriber session, and since subscriber sessions may have different QoS requirements and the context that is required for each subscriber session is known and set, the SMF 333 may create, update and remove the contexts for subscriber sessions in the UPF 332. The SMF 333 does this via policy rules which, in turn, are obtained from the PCF 335 and other nodes and delivers to the UPF via the N4 interface.

The N3 Interface may be used for transferring user data (e.g., user plane traffic) from the RAN 221 to the UPF 332 and may be used for providing low-latency services using edge computing resources. The electrical distance from the UPF 332 (e.g., located at the edge of a network) to user equipment, such as UE 210, may impact the latency and performance services provided to the user equipment. The data may be tunneled across the N3 Interface (e.g., IP routing may be done on the tunnel header IP address instead of using end user IP addresses). This may allow for maintaining a stable IP anchor point even though UE 210 may be moving around a network of cells or moving from one coverage area into another coverage area.

A cloud-based compute and storage infrastructure can include a networked computing environment that provides a cloud computing environment. Cloud computing may refer to Internet-based computing, where shared resources, software, and/or information may be provided to one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

Virtualization allows virtual hardware to be created and decoupled from the underlying physical hardware. One example of a virtualized component is a virtual router (or a vRouter). Another example of a virtualized component is a virtual machine. A virtual machine can include a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment. In some embodiments, applications and services may be run using virtual machines instead of containers in order to improve security. A common virtual machine may also be used to run applications and/or containers for a number of closely related network services.

The 5G network 220 may implement various network functions, such as the core network functions and radio access network functions, using a cloud-based compute and storage infrastructure. A network function may be implemented as a software instance running on hardware or as a virtualized network function. Virtual network functions (VNFs) can include implementations of network functions as software processes or applications. In at least one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

A logical hierarchical architecture may include National Data Centers (NDCs), Regional Data Centers (RDCs), and Breakout Edge Data Centers (BEDCs). In addition, Pass-through Edge Data Centers (PEDC) may serve as an aggregation point for all Local Data Centers (LDCs) and cell sites in a given location.

The cloud computing platform 279 can be logically and physically divided up into various different cloud computing regions. Each of cloud computing regions can be isolated from other cloud computing regions to help provide fault tolerance and stability. Further, each of cloud computing regions may provide superior service to a particular geographic region based on physical proximity. For example, a first cloud computing region may have its datacenters and hardware located in the northeast of the United States while cloud computing region may have its datacenters and hardware located in California. Each of cloud computing regions may include two or more cloud computing sub-regions. Each of cloud computing subregions can allow for redundancy that allows for fail-over protection. Such as, if a particular cloud computing sub-region experiences an outage, another cloud computing sub-region within the same cloud computing region can continue functioning and providing service. For example, a database that is maintained as part of NDC may be replicated in each cloud computing sub-region; therefore, if one of cloud computing sub-regions fail, a copy of the database remains up-to-date and available, thus allowing for continuous or near continuous functionality.

Figure 4:
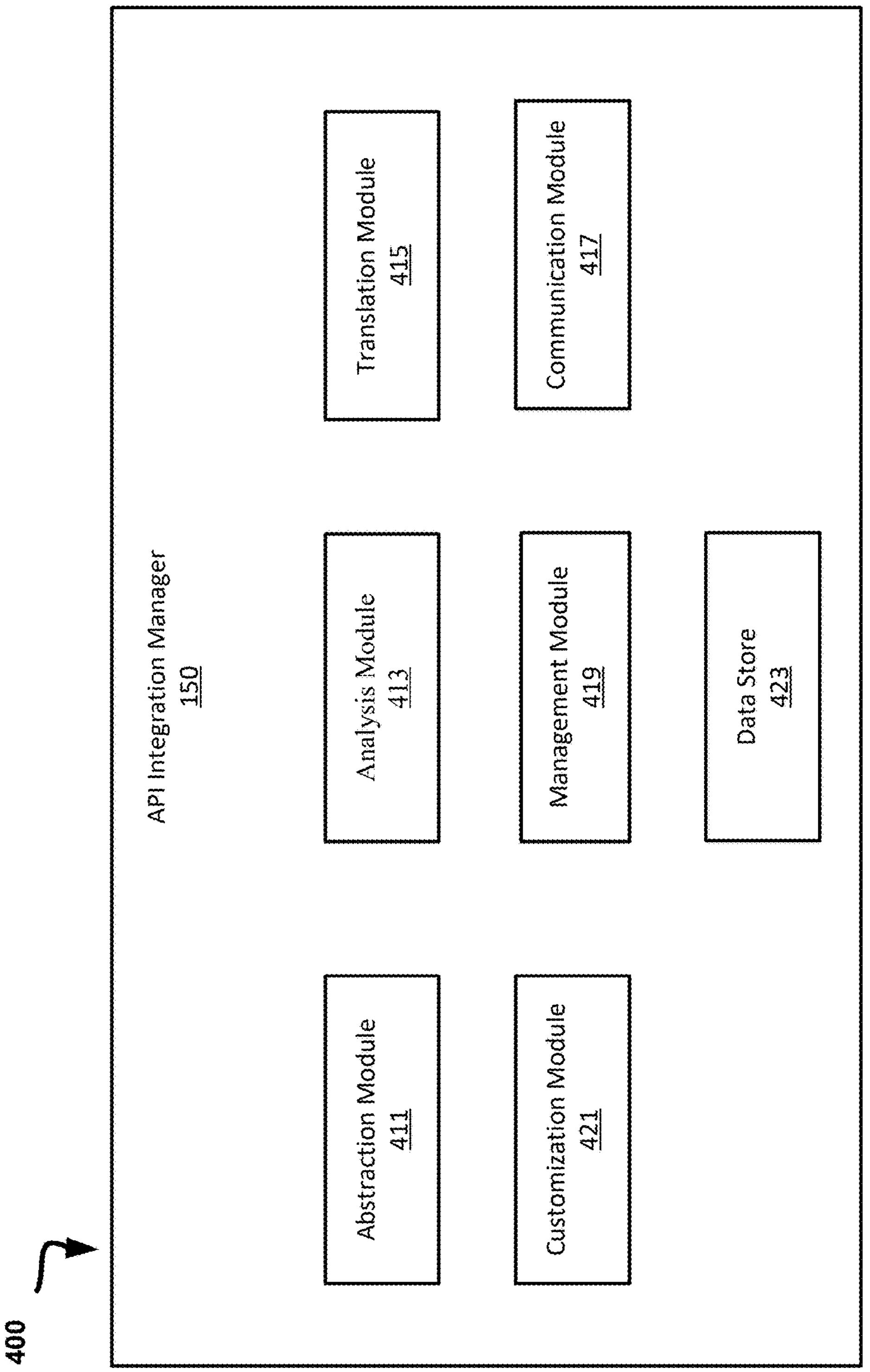
FIG. 4 illustrates an example API integration manager for a cellular network according to at least one embodiment.

The API integration manager 150 may communicate with internal API resources, external API resources 290, and UE 210 to provide a standardized design and development of APIs and allow the communication associated with various APIs to be performed smoothly and manageably. FIG. 4 illustrates an example API integration manager 150 that provides several functions for APIs integration. Referring to FIG. 4, the API integration manager may include an abstraction module 411, an extract, transform, load (ETL) module 413, a translation module 415, a communication module 417, a management module 419, and a customization module 421. The API integration manager 150 may further include a data store 423 storing data that are received, processed, and/or maintained by the API integration manager 150. The API integration manager 150 can work with the embedded APIs, vendor APIs, marketable APIs, etc. such that it can provide coherent API abstraction, design, development, and governance for these APIs.

Abstraction module 411 may include an abstraction layer to provide a generalization of the method (e.g., algorithm) to support how to proceed with APIs requests. In some implementations, the abstraction module 411 may provide a model for design and develop APIs. For example, the abstraction module 411 may provide a model to track the resource consumption in terms of content sent via API, determine the source and destination of API communication, monitor how API is used, monitor the status (e.g., stable or not) of API, determine whether a backward compatibility issue exists, etc. The abstraction layer allows easy reuse of a useful design/development pattern and may shield entities from the underlying complexity of the system. The abstraction layer may provide evolutionary design for new capabilities as the network evolves.

An API request may be sent from one API resource (i.e., source) to another API resource (i.e., destination). The API request may include operations to be executed (e.g., GET to retrieve a resource or POST to send data), authentication details (e.g., an API key that identifies the source), additional parameters, and a destination address (e.g., the URL of the API endpoint of the destination).

Analysis module 413 may include an extract, transform, and load (ETL) module that can extract data from input, transform the data, and load the data into an output data store. The analysis module 413 may determine the routing and the gateway of API requests. Routing is the process of directing API requests to the appropriate services, and a gateway is a tool that acts as a single entry point for API requests. In some implementations, the analysis module 413 may combine data from multiple sources into a central repository. In some implementations, the analysis module 413 may use a set of rules to clean and organize input data and prepare it for storage, data analytics, and machine learning (ML).

Translation module 415 may translate data in a first API format into a second API format. Translation module 415 may store the definitions of various APIs, including the first API, the second API, etc. Each API format may be specific to an API specification that standardize data exchange between API resources, enabling the ability of diverse systems written in different programming languages, running on different OSs, or using different technologies to seamlessly communicate with each other. The API format may include at least one of the following: a format of remote procedure call (RPC), a format of service object access protocol (SOAP), a format of representational state transfer (REST), a format of gRPC, or a format of GraphQL. Translation module 415 may use a pre-defined translation service to translate data in a first API format into a second API format.

In some implementations, the API documentations including the API specification and API requirements for various APIs may be stored in a data store 423. Translation module 415 may retrieve the API documentations in the data store 423 to translate data between different API formats.

Communication module 417 may communicate with various API resources, including internal API resources and external API resources. In some implementations, communication module 417 may receive the API requests from one API resource and relay the API requests to another API resource. In some implementations, communication module 417 may receive the API requests from one API resource and send the processed API requests to another API resource.

Management module 419 may manage models provided by the API integration manager 150. For example, the management module 419 may manage a monetization-model associated with the API request. For example, the monetization model may include model(s) of designing, developing, and testing APIs, model(s) of enforcing security policies and ensuring compliance with regulations associated with APIs, model(s) of tracking usage statistics, enforcing usage quotas, and rate limiting associated with APIs, model(s) of collecting and analyzing usage statistics and reporting on performance associated with APIs, model(s) of ensuring compliance with corporate policies and external regulations associated with APIs. As another example, the management module 419 may manage an access to a service catalog associated with the API request.

Customization module 421 may provide various customization associated with the API request. For example, the customization module 421 may provide a customization with a communications service provider (CSP) associated with the API request, where CSP may provide telecommuting, media entertainment, and application services.

In some implementations, a system (e.g., system 100 in FIG. 1, system 200 in FIG. 2, or system 300 in FIG. 3) may include a computing system to facilitate a cellular network (e.g., the cellular network 120 in FIG. 1, or 5G network in FIG. 2), the computing system may include one or more processing devices and memory communicatively coupled with and readable by the one or more processing devices and having stored therein processor-readable instructions which, when executed by the one or more processing devices, cause the one or more processing devices to perform operations described herein.

The computing system may be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The processing device may represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. Processing device may be configured to execute processor-readable instructions for performing the operations and steps discussed herein.

The memory may represent any combination of the different types of non-volatile memory devices (e.g., not- and (NAND) type flash memory and write-in-place memory, such as a three-dimensional cross-point ("3D cross-point") memory device) and/or volatile memory devices (e.g., random access memory (RAM), such as dynamic random access memory (DRAM) and synchronous dynamic random access memory (SDRAM)). Examples of memory include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory further include a dual in-line memory module (DIMM), a small outline DIMM (SO-DIMM), and various types of non-volatile dual in-line memory modules (NVDIMMs).

In some implementations, a system (e.g., system 100 in FIG. 1, system 200 in FIG. 2, or system 300 in FIG. 3) may include one or more non-transitory, computer-readable storage media having computer-readable instructions thereon which, when executed by one or more processing devices, cause the one or more processing devices to perform operations described herein. The term "computer-readable storage medium" should be taken to include a single medium or multiple media that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Processor-readable instructions or computer-readable instructions may include instructions to implement functionality corresponding to an API integration manager (e.g., the API integration manager 150 of FIGS. 1-3).

Figure 5:
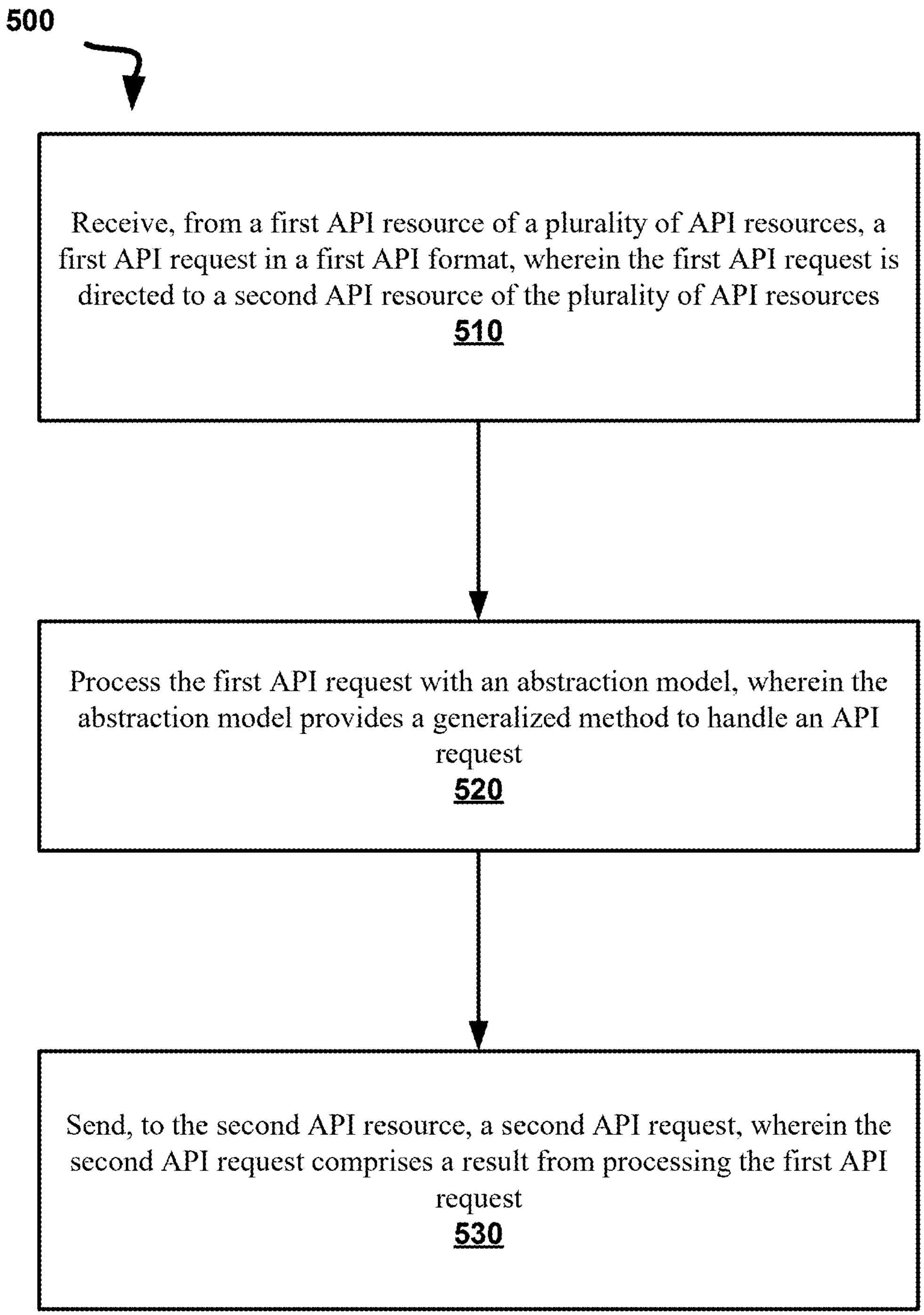
FIG. 5 is a flow diagram of an example method of implementing APIs integration for a cellular network according to at least one embodiment.

FIG. 5 is a flow diagram of a method 500 of implementing application programming interfaces (APIs) integration for a cellular network according to at least one embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by the system 100 of FIG. 1. In one embodiment, the method 500 is performed by the API integration manager 150 of FIGS. 1-3.

Referring to FIG. 5, at operation 510, the processing logic may receive, from a first API resource of a plurality of API resources, a first API request in a first API format, wherein the first API request is directed to a second API resource of the plurality of API resources.

In some implementations, the plurality of API resources comprises at least one of: a first set of network elements in one or more base stations, a second set of network elements in one or more transports, a third set of network elements in one or more core networks, a fourth set of network elements in one or more cloud-computing platforms, a fifth set of network elements in one or more network slices, or a set of external API resources that are external to the cellular network, and the set of external API resources comprises API resources from at least one of: an application, a service, a developer, an access gateway, an operation support system, or a business support system.

At operation 520, the processing logic may process the first API request with an abstraction model, wherein the abstraction model provides a generalized method to handle an API request. In some implementations, the abstraction model provides a generalized method to handle an API request according to one or more governance rules. In some implementations, the processing logic may store the one or more governance rules in a data store.

In some implementations, the processing logic may extract first data from the first API request, transform the first data to second data, and load the second data into a data store. In some implementations, the processing logic may determine at least one of: a routing of the first API request, or a gateway of the first API request. In some implementations, the processing logic may translate data in the first API format into a second API format, wherein the second API request is in the second API format. In some implementations, the processing logic may store definitions of the first API format and the second API format. In some implementations, the processing logic may manage a monetization model associated with the first API request. In some implementations, the processing logic may manage an access to a service catalog associated with the first API request. In some implementations, the processing logic may provide a customization with a communications service provider (CSP) associated with the first API request.

At operation 530, the processing logic may send, to the second API resource, a second API request, wherein the second API request comprises a result from processing the first API request. In some implementations, the second API request comprises a result of extracting, transforming, and loading. In some implementations, the second API request comprises a result of determining the routing and/or the gateway. In some implementations, the second API request comprises a result of translating. In some implementations, the second API request comprises a result of managing the monetization model. In some implementations, the second API request comprises a result of managing the access to a service catalog. In some implementations, the second API request comprises the customization with the communications service provider (CSP).

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions. One or more non-transitory, computer-readable storage media can have computer-readable instructions stored thereon which, when executed by one or more processing devices, cause the one or more processing devices to perform the operations described herein.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of application programming interfaces (APIs) integration for a cellular network, the method comprising:
- receiving, from a first API resource of a plurality of API resources, a first API request in a first API format, wherein the first API request is directed to a second API resource of the plurality of API resources, wherein the first API resource serves as a source of the first API request and the second API resource serves as a destination of the first API request;
- processing the first API request with a generalized method of handling an API request;
- translating data, of the first API request, in the first API format into a second API format; and
- sending, to the second API resource, a second API request in the second API format, wherein the second API request comprises a result from processing the first API request.

2. The method of claim 1, wherein the plurality of API resources comprises at least one of: a first set of network elements in one or more base stations, a second set of network elements in one or more transports, a third set of network elements in one or more core networks, a fourth set of network elements in one or more cloud-computing platforms, a fifth set of network elements in one or more network slices, or a set of external API resources that are external to the cellular network, and
- wherein the set of external API resources comprises API resources from at least one of: an application, a service, a developer, an access gateway, an operation support system, or a business support system.

3. The method of claim 1, further comprising:
- extracting first data from the first API request;
- transforming the first data to second data; and
- loading the second data into a data store.

4. The method of claim 1, further comprising:

determining at least one of: a routing of the first API request, or a gateway of the first API request.

5. The method of claim 1, further comprising:

storing definitions of the first API format and the second API format.

6. The method of claim 1, further comprising:

managing a monetization model associated with the first API request.

7. The method of claim 1, further comprising:

managing an access to a service catalog associated with the first API request.

8. The method of claim 1, further comprising:

providing a customization with a communications service provider (CSP) associated with the first API request.

9. The method of claim 1, wherein the generalized method handles the first API request according to one or more governance rules.

10. A computing system to facilitate a cellular network, the computing system comprising:

one or more processing devices; and memory communicatively coupled with and readable by the one or more processing devices and having stored therein processor-readable instructions which, when executed by the one or more processing devices, cause the one or more processing devices to perform operations comprising:

receiving, from a first application programming interfaces (API) resource of a plurality of API resources, a first API request in a first API format, wherein the first API request is directed to a second API resource of the plurality of API resources, wherein the first API resource serves as a source of the first API request and the second API resource serves as a destination of the first API request;

processing the first API request with a generalized method of handling an API request;

translating data, of the first API request, in the first API format into a second API format; and sending, to the second API resource, a second API request in the second API format, wherein the second API request comprises a result from processing the first API request.

11. The computing system of claim 10, wherein the plurality of API resources comprises at least one of: a first set of network elements in one or more base stations, a second set of network elements in one or more transports, a third set of network elements in one or more core networks, a fourth set of network elements in one or more cloud-computing platforms, a fifth set of network elements in one or more network slices, or a set of external API resources that are external to the cellular network, and wherein the set of external API resources comprises API resources from at least one of: an application, a service, a developer, an access gateway, an operation support system, or a business support system.

12. The computing system of claim 10, wherein the operations further comprise:

extracting first data from the first API request;

transforming the first data to second data; and loading the second data into a data store.

13. The computing system of claim 10, wherein the operations further comprise:

determining at least one of: a routing of the first API request, or a gateway of the first API request.

14. The computing system of claim 10, wherein the operations further comprise:

storing definitions of the first API format and the second API format.

15. One or more non-transitory, computer-readable storage media having computer-readable instructions thereon which, when executed by one or more processing devices, cause the one or more processing devices to perform operations comprising:

receiving, from a first application programming interfaces (API) resource of a plurality of API resources, a first API request in a first API format, wherein the first API request is directed to a second API resource of the plurality of API resources, wherein the first API resource serves as a source of the first API request and the second API resource serves as a destination of the first API request;

processing the first API request with a generalized method of handling an API request;

translating data, of the first API request, in the first API format into a second API format; and sending, to the second API resource, a second API request in the second API format, wherein the second API request comprises a result from processing the first API request.

16. The one or more non-transitory, computer-readable storage media of claim 15, wherein the plurality of API resources comprises at least one of: a first set of network elements in one or more base stations, a second set of network elements in one or more transports, a third set of network elements in one or more core networks, a fourth set of network elements in one or more cloud-computing platforms, a fifth set of network elements in one or more network slices, or a set of external API resources that are external to a cellular network, and wherein the set of external API resources comprises API resources from at least one of: an application, a service, a developer, an access gateway, an operation support system, or a business support system.

17. The one or more non-transitory, computer-readable storage media of claim 15, wherein the operations further comprise:

extracting first data from the first API request;

transforming the first data to second data; and loading the second data into a data store.

18. The one or more non-transitory, computer-readable storage media of claim 15, wherein the operations further comprise:

determining at least one of: a routing of the first API request, or a gateway of the first API request.

19. The one or more non-transitory, computer-readable storage media of claim 15, wherein the operations further comprise:

storing definitions of the first API format and the second API format.

* * * * *